United States Patent [19]

Harer et al.

[11] 4,210,855
[45] Jul. 1, 1980

[54] APPARATUS FOR REGULATING THE CURRENT DRAWN FROM AN ELECTRIC BATTERY

[75] Inventors: Helmut Harer, Aldingen-Neckarrems; Rolf Schulze, Vaihingen; Josef Juhasz, Vaihingen-enz-Rosswag, all of Fed. Rep. of Germany

[73] Assignee: Robert Bosch GmbH, Stuttgart, Fed. Rep. of Germany

[21] Appl. No.: 908,932

[22] Filed: May 24, 1978

[30] Foreign Application Priority Data

Jun. 10, 1977 [DE] Fed. Rep. of Germany ....... 2726367

[51] Int. Cl.² ............................................... H02J 7/04
[52] U.S. Cl. ......................................... 320/13; 320/32; 323/15; 323/20; 320/35
[58] Field of Search ....................... 320/13, 39, 31, 32, 320/35; 323/15, 20

[56] References Cited

U.S. PATENT DOCUMENTS 3,487,291  12/1969  Dowgiallo, Jr. ................. 320/32 X

FOREIGN PATENT DOCUMENTS 479184  11/1975  U.S.S.R. .................................... 320/13

Primary Examiner—Robert J. Hickey
Attorney, Agent, or Firm—Frishauf, Holtz, Goodman & Woodward

[57] ABSTRACT

A difference amplifier compares the sum of a signal corresponding to the voltage across the battery and a signal corresponding to the current through the battery to a reference signal. When the output of the difference amplifier indicates that the sum of the two signals is less than the reference signal, a limiter circuit responds to limit the current drawn from the battery by controlling a current regulator interconnected between the battery and its load. If desired, a temperature signal indicative of the battery of temperature can also be applied to the difference amplifier so that the point at which the regulation sets in varies as a function of temperature.

12 Claims, 2 Drawing Figures

APPARATUS FOR REGULATING THE CURRENT DRAWN FROM AN ELECTRIC BATTERY

The present invention relates to systems for regulating the current drawn from an electrical battery. In particular it relates to systems for preventing excessive discharge of a battery in an electrically driven vehicle.

BACKGROUND AND PRIOR ART

Systems for preventing excessive discharge of such batteries are known in which the current drawn from the battery is limited after the voltage across the battery has dropped to a predetermined minimum voltage level. This predetermined minimum voltage level is set by the manufacturer and, may, for example be a final discharge voltage $U_{ES}$ of 1.4 volts per cell after one-half hour of discharge. If the control is carried out in such a manner that this voltage $U_{ES}$ is maintained without taking into consideration what current the battery can still deliver then excessive discharge substantially decreases the life expectancy of the battery, that is the number of possible discharge cycles.

German publication DT-OS No. 2,324,305 describes a control system for the battery of a DC powered vehicle which a constant maximum available power is assured over a wide discharge region of the battery by limiting the available power when the charge on the battery is high. For this purpose, a voltage proportional to the voltage across the armature is applied across the rheostat which determines the current through the armature. A signal which corresponds to the product of voltage across the armature multiplied by current through the armature is applied to a limiter stage whose action is initiated in dependence on the charge state of the battery. Although the battery is used to better advantage by means of this constant power regulation, the prior art system has the disadvantage that low voltage regulation still takes place on the basis of constant battery voltage output.

THE INVENTION

Briefly, in accordance with the present invention, a signal corresponding to the current from the battery is combined (e.g. added) with a signal corresponding to the voltage across the battery. A comparator compares the combined signal to a reference signal and furnishes a difference signal corresponding to the difference therebetween. In a preferred embodiment the comparator is a difference amplifier. Limiter means interconnected between the comparator and the current regulator, which regulates the current drawn from the battery, control the latter as a function of the difference signal.

The above described system has the advantage that low voltage regulation is carried on as a function of battery current also. When the charge on the battery is low, regulation takes place along a characteristic discharge curve of the battery. If the characteristic curve is chosen within a region for which the battery will not be damaged, as for example a 10% discharge region, damage to the battery can be prevented even at very low voltages.

The system of the present invention is simple to construct and utilizes signals (eg the voltage at the battery terminals, the battery current) which are available in any case in an electrically driven vehicle.

In a preferred embodiment of the invention, the low voltage regulation also depends on the temperature of the battery. The critical temperature variations of the traction battery are therefore also taken into consideration.

DRAWINGS ILLUSTRATING A PREFERRED EMBODIMENT

Figure 1:
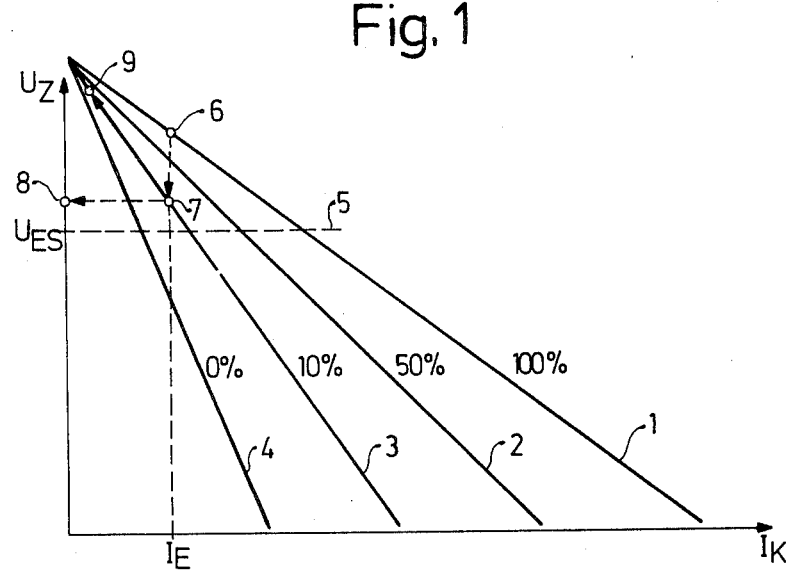
FIG. 1 shows the characteristic discharge curves of a traction battery.

As shown in FIG. 1, the characteristic curves of a traction battery are a family of straight lines showing the relationship between the voltage across the battery as plotted along the ordinate and battery short circuit current plotted along the abscissa. The different lines correspond to different charge conditions on the battery. For example line 1 shows the variation of voltage at the battery terminals vs. battery current when the battery is fully charged, line 2 when the battery is at 50% of full charge, line 3 when the charge of the battery is the minimum allowable charge of 10% and line 4 for a fully discharged battery. A dashed line 5 indicates the value of $U_{ES}$ which is the minimum voltage level set by the manufacturer for the particular battery type. For example for a particular battery, if the voltage across the battery drops to 1.4 volts ($U_{ES}$) at a discharge current of 500 amperes the discharge limit of the battery has been reached. Any further discharge will cause damage to the battery.

In an electrically powered vehicle having a traction battery, a particular operating current $I_E$ is required (FIG. 1). If the battery is fully loaded, it will operate along line 1 and, specifically, at operating point 6 corresponding to current $I_E$. As the battery discharges, the voltage across the cells drops until a second operating point 7 along line 3 is reached. In the prior art regulating systems, the regulation would now take place to maintain the voltage across the cell constant, that is the battery would be regulated to operate along the horizontal line conneting point 7 to point 8 on FIG. 1. In this type of regulation, the discharge line 4 would be crossed and an excessive discharge of the battery would take place.

Figure 2:
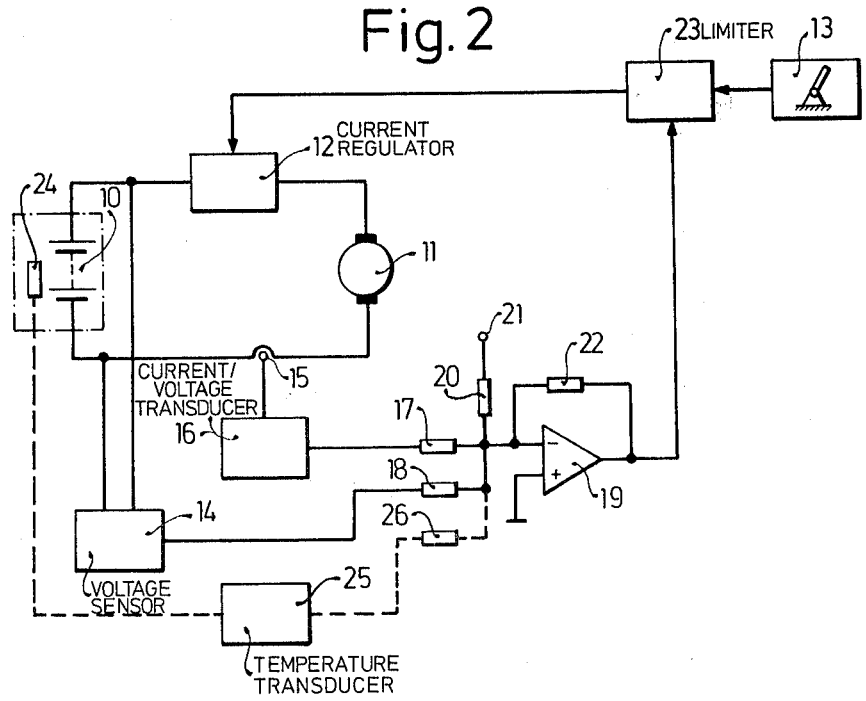
FIG. 2 is a schematic diagram of a preferred embodiment of the present invention.

In the regulating system of the present invention, as shown in FIG. 2, the regulation takes place as a function of battery current as well as a function of battery voltage. Specifically, the regulation is such that the battery operates from point 7 on line 3 to point 9 on line 3. Power can thus be drawn from the battery even beyond operating point 7 without crossing the critical discharge line 3.

In order to achieve the control mentioned above, the battery voltage $U_B$ and the battery current $I_B$ must be measured and the resultant values combine in such a manner that the critical discharge line is not crossed. A combination can take place by addition of the signal indicative of the current value to that of the voltage value and subsequent comparison of the combined signal to a reference signal. Alternatively, the discharge line can be implemented by a hyperbola which results from the multiplication of the current signal by the voltage signal.

In FIG. 2 a battery 10 energizes a motor 11. A current regulator 12 is connected between the battery and the motor. Current regulator 12 operates under control of an external operable selector 13. A voltage sensor 14 is connected across the terminals of batter 10, while a current sensor 15 is connected in series between the battery 10 and motor 11. A buffer 16 is connected to the output of sensor 15. The output of buffer 16 and that of voltage sensor 14 are connected through a resistor 17 and 18, respectively, to the inverting input of a difference amplifier 19. The direct input of difference amplifier 19 is connected to reference potential. The inverting input of difference amplifier 19 is connected through a resistor 20 to a terminal 21 at which a reference signal is furnished. The output of difference amplifier 19 is connected to one input of a limiter stage 23 whose other input is connected to the externally operable current selector 13. The output of limiter 23 controls current regulator 12.

Voltage sensor 14 furnishes a signal corresponding to the voltage $U_B$ across the battery terminals. This voltage is applied to the inverting input of difference amplifier 19 through resistor 18. Current sensor 15 is a very low ohmic resistor the voltage across which is applied to buffer 16. The output of buffer 16 is connected through a resistor 17 to the inverting input of difference amplifier 19. The point at which the regulation of the circuit sets in is determined by the voltage applied at terminal 21. This voltage determines along which of the characteristic curves of FIG. 1 the regulation is to take place. For a constant battery current $I_B$ no regulation will take place until the sum of the sensed current signal and the sensed voltage signal is less than the reference signal applied at terminal 21. As the voltage across the terminals of the battery decreases during further discharge of the battery, the sum signal and the reference signal become equal and difference amplifier 19 furnishes an output signal herein referred to as the difference signal. This is applied to limiter stage 23. The output of limiter 23 then controls current regulator 12 to decrease the current drawn from the battery, thereby increasing the terminal voltage across the battery. The regulation to a constant sum of sensed voltage and sensed current leads along line 3 of FIG. 1 from point 7 to point 9. To prevent a high degree of limiting of battery current $I_B$ when the selected discharge line is reached, the feedback coupling of difference amplifier 19 can be so arranged that the limiting action sets in somewhat earlier, for example when the battery is 20% discharged, and stops when the capacity remaining in the battery has reached 5%.

In a particularly preferred embodiment the fact that the discharge characteristics of the battery vary as a function of temperature is also taken into consideration. A temperature sensor 24 is provided which is thermal contact with batter 10. The temperature sensor furnishes a sensed temperature voltage whose amplitude varies as a function of battery temperature. The temperature sensor output signal is applied to a buffer or voltage level changing stage 25. The output of stage 25 is connected through a resistor 26 to the common point of resistors 17 and 18, that is to the inverting input of difference amplifier 19. The point at which regulation sets in is then additionally controlled as a function of temperature.

In a preferred embodiment stage 14 is a DC amplifier. This amplifier may be dispensed with if the negative terminal of the battery is at reference potential. The same is true for stage 16.

Stage 23 includes a potentiometer whose variable arm is operated by pedal 13. The current through a motor associated with current regulator stage 12 varies in dependence on the position of the variable arm. The motor drives the rheostat which controls the current flowing from battery 10 to motor 11.

Typical values are:

$U_{ES}$: 277 V
$I_E$: 400 A
reference voltage 21: +5 V
resistor 17: 33 kΩ
resistor 18: 10 kΩ
resistor 22: 33 kΩ
resistor 26: 20 kΩ

Various changes and modifications may be made within the scope of the inventive concept.

We claim:

1. In a system having an electrical battery (10), a load (11) connected to said battery, and current regulator means (12) for regulating the current drawn from said battery under external control, the improvement comprising, in accordance with the invention, voltage sensor means (14) connected across said battery for furnishing a sensed voltage signal corresponding to the voltage across said battery;
   current sensor means (15-16) connected in series with said load for furnishing a sensed current signal corresponding to said current drawn from said battery;
   means for furnishing a reference signal;
   additive combining means (17, 18) connected to said voltage sensor means and said current sensor means, adding the voltage signal and the current signal, and furnishing a combined addition signal;
   comparing means (19) connected to said combining means and said means for furnishing a reference signal for comparing said combined signal to said reference signal and furnishing a difference signal corresponding to the difference therebetween;
   and limiter means (23) interconnected between said comparing means and said current regulator means, for controlling said current regulator means.

2. A system as set forth in claim 1, wherein said comparing means comprises a difference amplifier.

3. A system as set forth in claim 2, wherein said additive combining means comprises a first resistor (17) connected to said current sensor means, a second resistor (18) connected to said voltage sensor means and means for connecting said first and second resistor to said difference amplifier.

4. A system as set forth in claim 2, further comprising selector means connected to said current regulator means for setting said current regulator means to draw a desired current from said battery;
   and wherein said limiter means comprises means interconnected between said selector means, said difference amplifier and said current regulator means for limiting said desired current in accordance with said difference signal.

5. A system as set forth in claim 1, further comprising temperature sensor means (24) for furnishing a sensed temperature signal;
   and means (25, 26) for connecting said temperature sensor means to said comparator means in such a manner that said difference signal varies also as a function of said sensed temperature signal.

6. System as set forth in claim 1, further comprising temperature sensor means (24) for furnishing a sensed temperature signal;

and temperature additive combining means (26) connecting said sensed temperature signal to said additive combining means (17,18) and additionally algebraically adding the temperature signal to the combined addition signal for further connection to said comparing means.

7. System as set forth in claim 6, wherein the temperature addition combining means comprises a temperature addition resistor (26) connected to said temperature sensor means (24) and means for connecting said temperature addition resistor to said comparing means (19).

8. System as set forth in claim 6, wherein said comparator means comprises a difference amplifier (19);
said additive combining means comprises a first resistor (17) connected to said current sensor means, a second resistor (18) connected to said voltage sensor means;
the temperature addition combining means comprises a temperature addition resistor connected to said temperature sensor means;
and means for connecting said first resistor, said second resistor, and said temperature addition resistor to said difference amplifier.

9. In a system having an electrical battery (10), a load (11) connected to said battery, and current regulator means (12) for regulating the current drawn from said battery under external control, the improvement comprising, in accordance with the invention, voltage sensor means (14) connected across said battery for furnishing a sensed voltage signal corresponding to the voltage across said battery;
current sensor means (15-16) connected in series with said load for furnishing a sensed current signal corresponding to said current drawn from said battery;
temperature sensor means (24) for furnishing a sensed temperature signal;
means for furnishing a reference signal;
combining means (17, 18, 26) connected to said voltage sensor means, said current sensor means, and said temperature sensor means for furnishing a combined signal varying as a predetermined mathematical function of said sensed voltage signal, said sensed current signal, and said sensed temperature signal;
comparing means (19) connected to said combining means and said means for furnishing a reference signal for comparing said combined signal to said reference signal and furnishing a difference signal corresponding to the difference therebetween;
and limiter means (23) interconnected between said comparing means and said current regulator means, for controlling said current regulator means.

10. System as set forth in claim 9, wherein said combining means (17, 18, 26) are additive combining means algebraically adding the voltage signal, the current signal, and the sensed temperature signal.

11. System as set forth in claim 10, wherein said additive combining means comprises a first resistor (17) connected to said current sensor means, a second resistor (18) connected to said voltage sensor means, and a third resistor (26) connected to said temperature sensor means;
and means for connecting said first, said second, and said third resistors to said comparator means.

12. System as set forth in claim 11, further comprising selector means connected to said current regulator means for setting said current regulator means to draw a desired current from said battery;
and wherein said limiter means comprises means interconnected between said selector means, said comparing means and said current regulator means for limiting said desired current in accordance with said difference signal.

* * * * *